(12) United States Patent
Suppelsa et al.

(10) Patent No.: US 9,479,213 B2
(45) Date of Patent: Oct. 25, 2016

(54) CONTROL INTERFACE FOR A COMMUNICATION DEVICE

(71) Applicant: MOTOROLA SOLUTIONS, INC, Schaumburg, IL (US)

(72) Inventors: Anthony J. Suppelsa, Parkland, FL (US); Jorge L. Garcia, Plantation, FL (US); David M. Yeager, Boca Raton, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 125 days.

(21) Appl. No.: 14/319,881

(22) Filed: Jun. 30, 2014

(65) Prior Publication Data

US 2015/0381230 A1 Dec. 31, 2015

(51) Int. Cl.
| | |
|---|---|
| *H04B 1/00* | (2006.01) |
| *H04B 1/48* | (2006.01) |
| *H04B 1/3827* | (2015.01) |
| *H04B 1/401* | (2015.01) |
| *H04B 1/04* | (2006.01) |
| *H04W 4/22* | (2009.01) |
| *G06F 3/0362* | (2013.01) |

(52) U.S. Cl.
CPC .............. *H04B 1/48* (2013.01); *G06F 3/0362* (2013.01); *H04B 1/0475* (2013.01); *H04B 1/3833* (2013.01); *H04B 1/401* (2013.01); *H04W 4/22* (2013.01); *H04B 2001/0416* (2013.01); *H04B 2001/485* (2013.01)

(58) Field of Classification Search
CPC ....................................................... H04B 1/48
USPC ........................................................ 455/90.2
See application file for complete search history.

(56) References Cited

U.S. PATENT DOCUMENTS

| | | | |
|---|---|---|---|
| 1,990,072 A | 2/1935 | Hagen | |
| 3,177,432 A | 4/1965 | Kelln | |
| 5,513,268 A * | 4/1996 | Bironas ..................... | H03J 1/22 381/104 |
| 5,711,415 A | 1/1998 | Fukuda et al. | |
| 6,137,379 A * | 10/2000 | Morrill ................ | H03H 1/0007 333/169 |
| 7,960,661 B2 | 6/2011 | Wlotzka et al. | |
| 8,249,277 B2 | 8/2012 | Wong et al. | |
| 8,432,796 B2 | 4/2013 | Jayapalan et al. | |
| 8,611,546 B2 | 12/2013 | Williams et al. | |
| 2002/0025830 A1 | 2/2002 | Nishiyama et al. | |
| 2004/0118664 A1 | 6/2004 | DePue et al. | |
| 2005/0180585 A1* | 8/2005 | Hsieh ................... | H03G 1/0088 381/104 |
| 2009/0215439 A1 | 8/2009 | Hamilton et al. | |
| 2010/0088345 A1* | 4/2010 | Utsuki .................. | G06F 3/0482 707/797 |
| 2011/0281533 A1* | 11/2011 | Deleus .................. | G06F 3/0338 455/90.2 |
| 2013/0217351 A1 | 8/2013 | Jarvinen et al. | |

FOREIGN PATENT DOCUMENTS

| | | |
|---|---|---|
| EP | 1993269 A1 | 11/2008 |
| WO | 2011143017 A1 | 11/2011 |

OTHER PUBLICATIONS

The International Search Report and the Written Opinion, PCT/US2015/037058, filed: Jun. 23, 2015, mailed Feb. 25, 2016, all pages.

* cited by examiner

*Primary Examiner* — Wen Huang
(74) *Attorney, Agent, or Firm* — Barbara R. Doutre

(57) ABSTRACT

A portable radio (100) having a control knob (102) can further enable additional radio control functions through a rapid back and forth bi-directional rotation (202, 204, 206) of the knob (102). No additional buttons or menu features are required.

21 Claims, 5 Drawing Sheets

CONTROL INTERFACE FOR A COMMUNICATION DEVICE

FIELD OF THE DISCLOSURE

The present disclosure relates generally to portable communication devices, and more particularly to a control interface for a portable radio communication device.

BACKGROUND

Communication devices, such as portable two-way radios operated by public safety personnel, are operated through a variety of user interface control features. Such control features typically include volume adjustment, channel change, and menu driven displays. Public safety personnel, such as law enforcement officers and firefighters, use their radios under a variety of work conditions exchanging communications with other personnel. It would be advantageous for the users of these radios to be able to turn on and off an additional function; however the ability to add another radio control function must be balanced with the space constraints of the radio. An additional button would take much needed room, and a menu feature would be cumbersome to initiate. Also, in mission critical applications where a control knob is sized for gloved usage, large knobs are highly desirable. Hence, it would be preferable not to impact the size and number of knobs on the radio.

Accordingly, it would be advantageous to have a radio with an additional control function that does not require the addition of a new button or menu feature.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
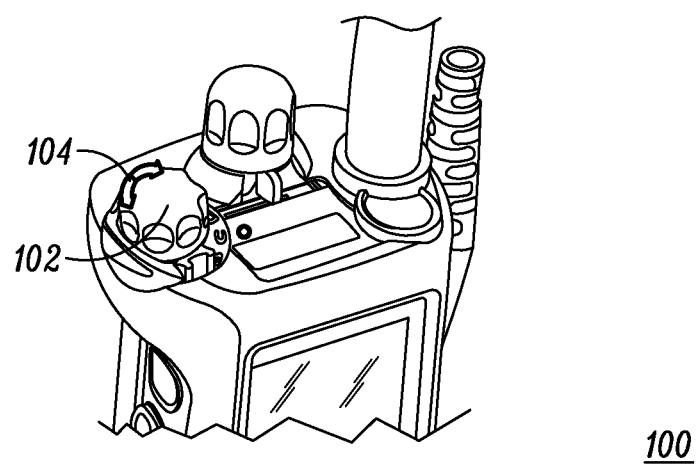
FIG. 1 is a radio incorporating a control interface formed and operating in accordance with the various embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Briefly, in accordance with the various embodiments a radio control interface is provided herein. A communication device having a control knob can further enable additional control functions through a rapid back and forth bi-directional movement of the knob. No additional buttons or menu features are required thereby advantageously minimizing cost and complexity.

FIG. 1 is a radio 100 incorporating a radio control interface formed and operating in accordance with the various embodiments. The radio 100 may be a portable two-way radio, or other portable communication device, which utilizes an internal controller and transceiver to communicate with other similar devices. Radio 100 comprises a control knob 102 for controlling a predetermined function of the radio, for example volume. The control knob 102 may comprise an external rotary control knob operatively coupled to an internal switch and to the controller of the radio 100. The control knob 102 controls a primary radio control function in accordance with standard operation. For example, a volume function is controlled using rotational movements to increase and decrease the volume of the radio 100 in a known manner. In accordance with the various embodiments, the radio's controller is further configured for the detection of rapid, back and forth bi-directional rotation of the control knob 102 to provide additional control functions without the use of an additional knob or switch. For example, a rapid, up and down volume delta enables (or disables) an additional radio control function. Such additional secondary radio control functions may include but are not limited to toggling: automatic gain control (AGC), noise suppression, LED, treble boost, profile switching, bass boost, and/or compression (hi vs lo) to name a few.

For public safety radios, the ability to add radio control functions without adding another knob or menu feature is highly beneficial. The use of the single knob and its associated switch negates any need for significant additional electrical or mechanical components thereby minimizing cost and complexity. Additionally, for a control knob sized for gloved usage, incorporating the control interface of the various embodiments minimizes issues associated with having to locate additional knobs or manipulate a menu driven display.

Figure 2:
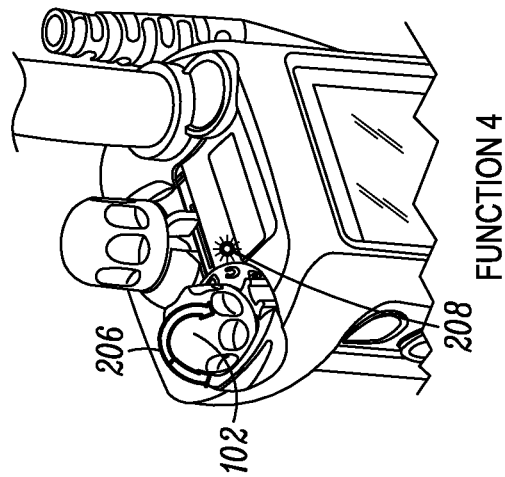
FIG. 2 shows a more detailed example of the radio control interface operating in accordance with the various embodiments.
Figure 2:
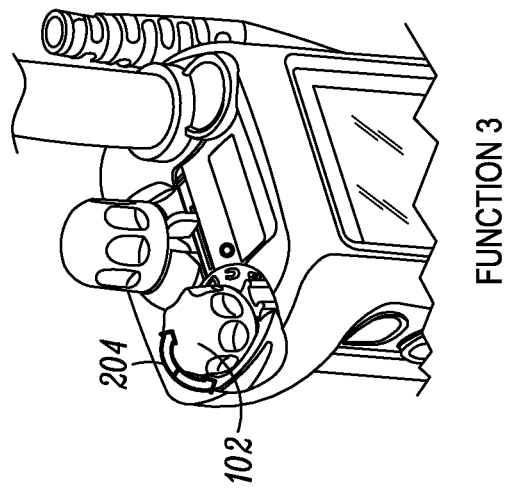
Figure 2:
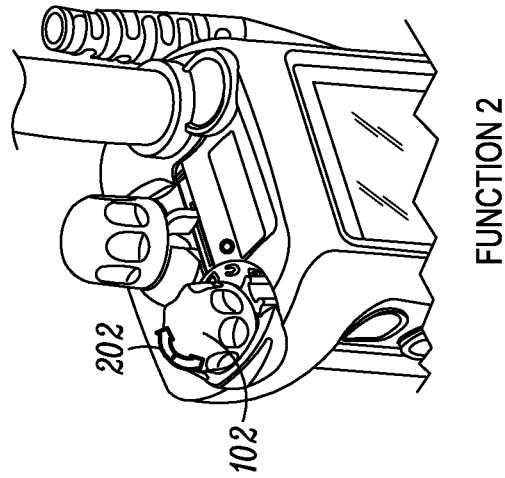

FIG. 2 shows a more detailed example of the radio control interface operating in accordance with the various embodiments. Again, radio 100 may be a portable two-way radio or other portable communication device having a user interface comprising a control knob 102. A plurality of bi-directional control angles 202, 204, and 206 are shown to represent the enablement of three additional control functions to control knob 102. Rapid (speed) bi-directional rotation (angle) are detected by the radio to enable different radio control functions. An enabled function can be disabled by repeating the rapid back and forth movement.

The predetermined angle of bi-directional rotation can be set based on the number of additional control features being controlled by the control knob. For example, if the control knob is only going to have one additional control feature added, then the angle of bi-directional rotation can have a wider range of angle tolerance. The combination of rapid rotation (predetermined speed) and bi-directional angular rotation (predetermined angle) can be set and saved within the radio for each control function. The speed can be the same for a plurality of functions and the bi-directional angle of rotation can be varied. The detection of speed allows a rapid back and forth movement to be used to distinguish secondary control features from the control knob's primary function. For example, if the primary function of the control knob is volume, then standard turning of the knob 102 to increase (in one direction) and decrease (in the opposite) direction will continue to control volume as the primary function. Only a rapid, back-and-forth angular rotation of the knob 102 will enable the additional function.

Continuing to refer to FIG. 2, a plurality of secondary control functions are enabled through different bi-directional rotation angles. For example a bi-directional rotation angle of less than 15 degrees may enable automatic gain control (AGC), a bi-directional rotation angle of greater than 15 degrees and less than 90 degrees may enable noise suppression, and a bi-directional rotation angle of greater than 90 degrees may enable an LED 208.

In accordance with the various embodiments, several radio control functions can be preset with the bi-directional angular change in the back and forth movement of the knob. The additional function is enabled without the use of an additional knob or switch making the control interface highly advantageous to radios having tight space requirements.

Figure 3:
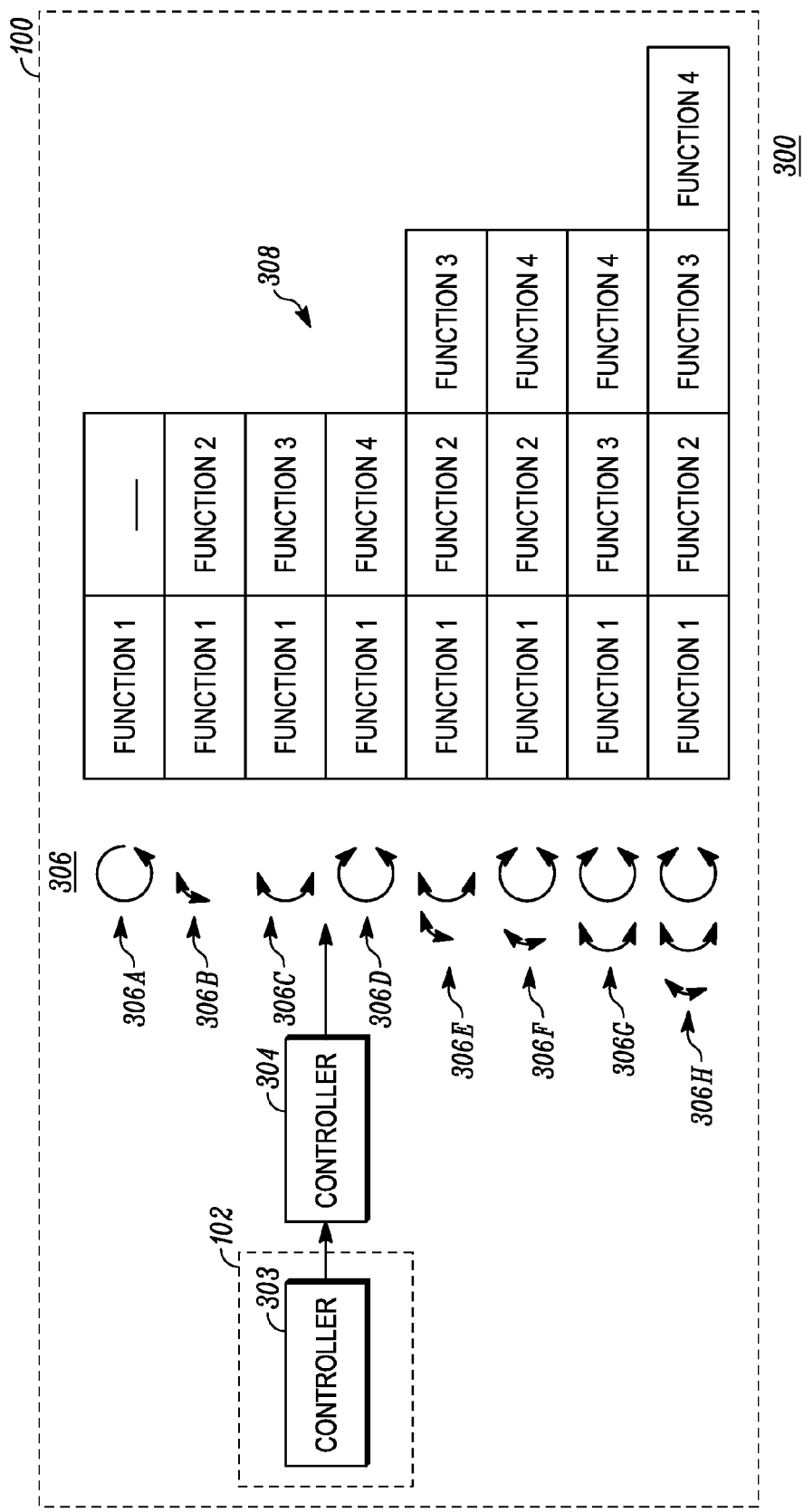
FIG. 3 is a block diagram of a plurality of bi-directional rotation angles and associated control functions enabled by a single control switch in accordance with the various embodiments.

FIG. 3 is a block diagram 300 of a plurality of bi-directional angles of rotation 306 and associated radio control functions 308 enabled by a single control switch 302 in accordance with the various embodiments. Radio 100 comprises the control knob 102 operatively coupled to switch 302 which is operatively coupled to a controller 304. As the control knob 102 is rotated, the controller 304 detects movement, speed, and angular rotations of the knob 102 through the switch 302 thereby controlling the plurality of radio control functions 308. The bi-directional angles of rotation from FIG. 2 shown as 202, 204, and 206 are shown in FIG. 3 as 306B, 306C, and 306D. The primary radio control function is represented by FUNCTION 1, and the secondary radio control functions are represented by FUNCTION 2, FUNCTION 3, and FUNCTION 4.

Various angles of rotation are illustrated at 306 which align with associated control functions at Table 308. For example, standard on-way rotation 306A enables the primary function (FUNCTION 1) of the radio 100, such as volume. A volume function can be adjusted in a standard fashion by rotating the knob in one direction to increase volume and rotating the knob in another direction to decrease volume. The radio's controller 304 distinguishes movement for standard volume control from that of the rapid, bi-directional rotation used for secondary radio control functions based on stored parameters of speed and predetermined angles of rotation.

In accordance with the various embodiments, additional features are enabled and disabled through the use of bi-directional rotation over predetermined rotation angles and predetermined speed. Thus, a plurality of different rapid back-and-forth movements can advantageously enable (and disable) additional control features without the addition of another knob or switch.

Continuing to refer to FIG. 3, bi-directional rotation 306B enables the second function (FUNCTION 2), such as for example automatic gain control (AGC). In accordance with the various embodiments, the primary function (FUNCTION 1) is not disabled when an additional function is enabled. Depending on the type of function being added, it is possible that the secondary function may impact the primary function. For example, enabling an audio related feature, such as automatic gain control (AGC), may make the volume louder or lower. It is also possible that the additional enabled function may not impact the primary function. For example, enabling a non-audio related feature, such as an LED function would not impact the primary function of volume. The additional function can be disabled by repeating the bi-directional rotation, in this case bi-directional rotation 306B.

With the second function disabled, another bi-directional angle of rotation 306C enables a third radio control function (FUNCTION 3), such as noise suppression. Thus, the radio is performing with both the primary function (FUNCTION 1), for example volume with the third function (FUNCTION 3), noise suppression, enabled. The third function (FUNCTION 3) can be disabled by repeating the bi-directional angle of rotation 306C.

With the third function disabled, the rotation of another bi-directional angle 306D enables a fourth radio function (FUNCTION 4), such as such as an LED. Thus, the radio is performing with both the primary function (FUNCTION 1), for example volume with the fourth function (FUNCTION 4), LED enabled. The fourth function (FUNCTION 4) can be disabled by repeating the bi-directional angle of rotation 306D.

In accordance with the various embodiments, a plurality of secondary radio control functions may co-exist with the primary function. For example, at 306E, two bi-directional angular rotations enable two additional, radio control functions in addition to the primary control function. Thus, FUNCTION 1, FUNCTION 2, and FUNCTION 3 can co-exist. For example, volume, automatic gain control, and noise suppression can all be enabled and co-exist through a single knob.

At 306F, two bi-directional angular rotations enable two additional control functions in addition to the primary control function. Thus, FUNCTION 1, FUNCTION 2, and FUNCTION 4 can co-exist. For example, volume, automatic gain control, and an enabled LED can all co-exist.

At 306G, two bi-directional angular rotations enable two additional control functions in addition to the primary control function. Thus, FUNCTION 1, FUNCTION 3, and FUNCTION 4 can co-exist. For example, volume, noise suppression, and an enabled LED can all co-exist.

As another example, at 306H three bi-directional angular rotations enable three additional control functions in addition to the primary control function. Thus, FUNCTION 1, FUNCTION 2, FUNCTION 3, and FUNCTION 4 can co-exist. For example, volume, automatic gain control, noise suppression, and an enabled LED can all co-exist.

The various embodiments of bi-directional rotation enable a single control knob and switch to control a plurality of secondary radio control functions in addition to the standard primary function.

Various methods for enabling and using the control interface are described next. These methods are based on storing within the radio, one or more of a plurality of predetermined bi-directional control knob rotation angles and predetermined rotation speed (or speeds) associated therewith. Each bi-directional rotation and associated predetermined rotation speed corresponds to a different radio control function. As mentioned early, the predetermined speed (or range of speeds) may be the same for each radio control function as the speed parameter is selected to represent a rapid movement.

Figure 4:
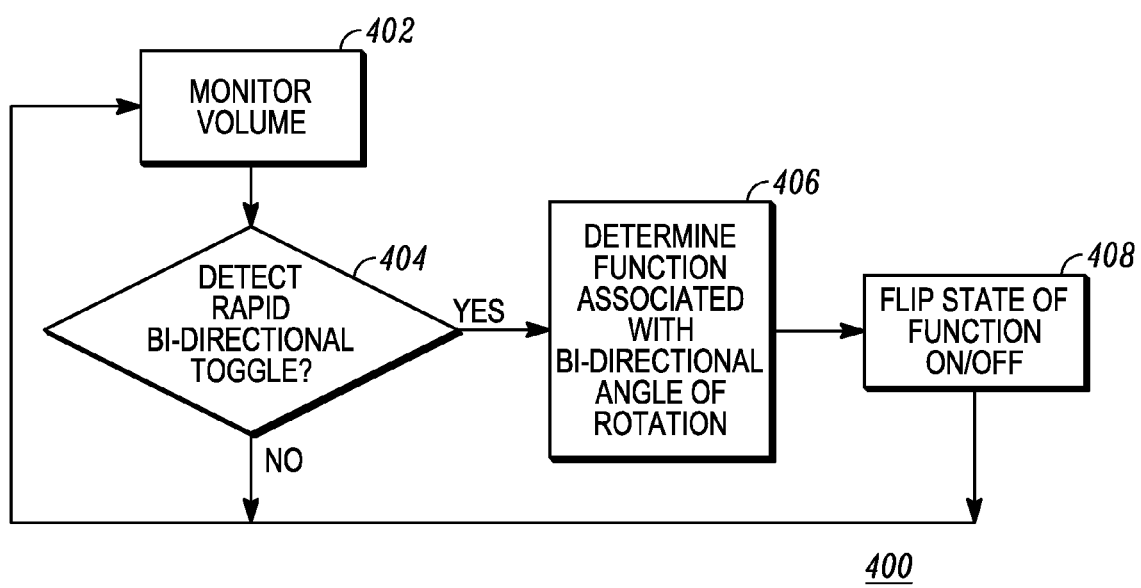
FIG. 4 is a method of a secondary control function being enabled and disabled by a control interface operating in accordance with the various embodiments.

FIG. 4 is a method 400 of a secondary radio control function being enabled and disabled by a control interface operating in accordance with the various embodiments. At 402, the primary radio control function, in this example volume, is monitored by the radio controller. If a rapid up/down volume delta is detected at 404, then the secondary radio control function is determined at 406. The secondary radio control function is determined based on the angle of rotation of the bi-directional movement. The secondary radio control function is associated with a predetermined bi-directional angle of rotation. The secondary radio control function is enabled (or disabled if previously enabled) at 408. For example, if the secondary radio control function is determined to be automatic gain control (AGC), then the AGC function may be flipped ON (from an OFF state) or flipped OFF (from an ON state) at 408. In accordance with the various embodiments, method 400 allows for one or more secondary control functions to be toggled by the same control knob which controls a primary radio control function.

In accordance with a further embodiment, the bi-directional toggle may further enable and disable remote radio control functions as well as local radio control functions. A rapid, short angular rotation can enable a radio control feature at the local (receive) radio, and a larger angular rotation can control a radio function at a transmitting radio. Again, the speed and angle of rotation are used to determine the secondary radio control function and whether the control is to be local or remote. For example, a rapid bi-directional rotation of a predetermined angle at the volume control knob could turn on or off noise suppression on the other end so the listener could better determine the noise situation at the transmitting end. Thus, rapid, bi-directional angular rotation of a control knob can be advantageously applied to toggle radio control functions for both local and/or remote radio control applications.

Figure 5:
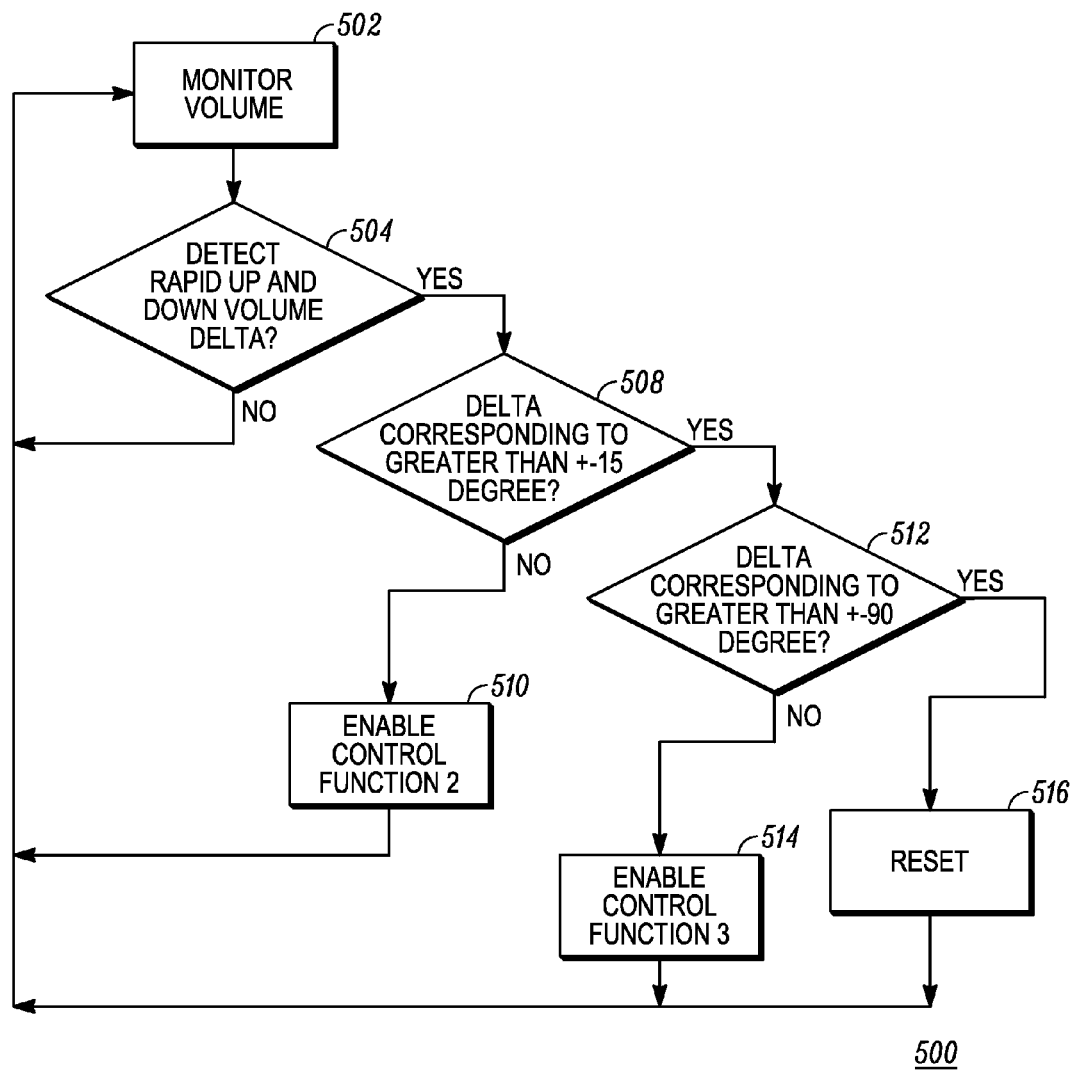
FIG. 5 is a method of a plurality of secondary radio control functions being enabled and disabled by a control interface operating in accordance with the various embodiments.

FIG. 5 is a method 500 of a plurality of secondary radio control functions being enabled and disabled by a control interface operating in accordance with the various embodiments. In this example, the primary control function is volume and the plurality of secondary control functions are generally specified as radio control function 2 and radio control function 3. The primary function is monitored at 502 for the detection at 504 of a rapid (predetermined speed); back and forth (bi-directional) angle of rotation. If no rapid back and forth movement is detected then the radio continues to monitor for standard volume at 502.

In this example, when a rapid up and down volume delta is detected at 504, then the angle of rotation is compared to a first predetermined angle of rotation at 508 (for example greater than +/−15 degrees). If the detected angle of rotation is less than +/−15 degrees at 508, then the second radio control function is enabled at 510.

If the detected angle of rotation is greater than +/−15 degrees at 508, then the angle of rotation is compared against a second predetermined angle of rotation, such as +/−90 degrees. If the detected angle of rotation is less than +/−90 degrees at 512, then the third radio control function is enabled at 514.

If the detected angle of rotation is greater than +/−90 degrees at 512, then the method can be reset at 516 without enabling an additional function.

Thus a range of bi-directional angles can be set to enable a plurality of different radio control functions. Also, once an additional function has been enabled, say at 510, the radio can still loop back and monitor for other additional functions to be enabled. Thus, for example an LED and noise suppression can be enabled via the same control knob without an additional physical knob or switch.

Accordingly, there has been provided a communication device having a single control knob that controls a plurality of radio control functions through the detection of rapid, bi-directional rotation. While the examples have described a volume control knob having increased functionality of automatic gain control, noise suppression and an LED, it is understood that other control features may also be suitable. The ability to adjust the first radio control function, after the second radio control function (or plurality of secondary radio control functions) has been enabled allows the primary radio control function to co-exist with the other enabled radio control features.

For public safety radios, the ability to add radio control functions without impacting the size or layout of the interface is highly beneficial. The ability to have additional control functions added to a single knob minimizes issues associated with having to locate additional knobs or manipulate a menu driven display. The ability to provide additional control without additional buttons, components, or menu features advantageously minimizes cost and complexity.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

While the embodiments described have been applied to microcontrollers, it will be appreciated that some embodiments may alternatively be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A control interface for a portable radio, comprising:
   a control knob coupled to the portable radio for enabling a primary radio control function of the portable radio;
   a controller for sensing speed and direction of the control knob, the controller enabling a secondary radio control function in response to detecting a bi-directional rotation of the control knob at a predetermined speed, and wherein the primary radio control function continues to be enabled while the secondary radio control function is enabled; and
   a single control switch operatively coupled to the control knob to control the primary radio control function, and the same single control switch for controlling the secondary radio control function.

2. The control interface of claim 1, wherein the control knob is a rotary control knob.

3. The control interface of claim 1, wherein the bi-directional rotation comprises a back and forth movement of the control knob.

4. The control interface of claim 1, wherein the primary radio control function is volume, and the secondary radio control function is an audio related feature.

5. The control interface of claim 4, wherein the audio related feature is automatic gain control (AGC).

6. The control interface of claim 4, wherein the audio related feature is noise suppression.

7. The control interface of claim 1, wherein the primary radio control function is volume, and the secondary radio control function is a non-audio related feature.

8. The control interface of claim 1, wherein the control knob is sized for gloved usage.

9. The control interface of claim 1, wherein the portable radio is a public safety radio.

10. The control interface of claim 1, wherein a plurality of secondary radio functions are preset and enabled based on bi-directional rotation angle of the control knob.

11. The control interface of claim 1, wherein the control knob is a non-pressure sensitive control knob.

12. A method of controlling a radio, comprising:
    detecting a control knob rotation of the radio;
    enabling a primary radio control function in response to the control knob rotation;
    detecting a bi-directional rotation of the control knob at a predetermined speed by a controller of the radio;
    enabling, by the controller, a secondary radio control function without disabling the primary radio control function in response to the detection of bi-directional rotation; and
    wherein a single switch is operatively coupled to the control knob to control the primary radio control function, and the same single control switch controls the secondary radio control function.

13. The method of claim 12, wherein detecting the bi-directional rotation of the control knob at the predetermined speed, further comprises:
    comparing a rotation angle of the bi-directional rotation to predetermined rotation angles associated with a plurality of different radio control functions.

14. The method of claim 12, further comprising:
    detecting another bi-directional rotation of the control knob at the predetermined speed; and
    enabling another secondary radio control function without disabling the primary radio control function.

15. The method of claim 14, wherein the primary radio control function and a plurality of secondary radio control functions are enabled.

16. The method of claim 12, wherein the primary radio control function comprises volume and the secondary radio control function being enabled by the bi-directional rotation comprises an automatic gain control (AGC) function.

17. The method of claim 12, wherein the primary radio control function comprises volume and the secondary radio control function being enabled by the bi-directional rotation comprises a noise suppression function.

18. The method of claim 12, further comprising, prior to detecting the control knob rotation of the radio:
    storing a plurality of bi-directional control knob rotations, each having predetermined rotations angles and predetermined rotation speeds associated therewith, each bi-directional movement and associated predetermined rotation speed corresponding to a different radio control function.

19. The method of claim 12, further comprising;
adjusting the primary radio control function using the control knob, after the secondary radio control function is enabled.

20. The method of claim 12, wherein the secondary radio control function is at least one of:
a local radio control function; and
a remote radio control function.

21. The method of claim 12, wherein the control knob is a non-pressure sensitive control knob.

\* \* \* \* \*